UNITED STATES PATENT OFFICE.

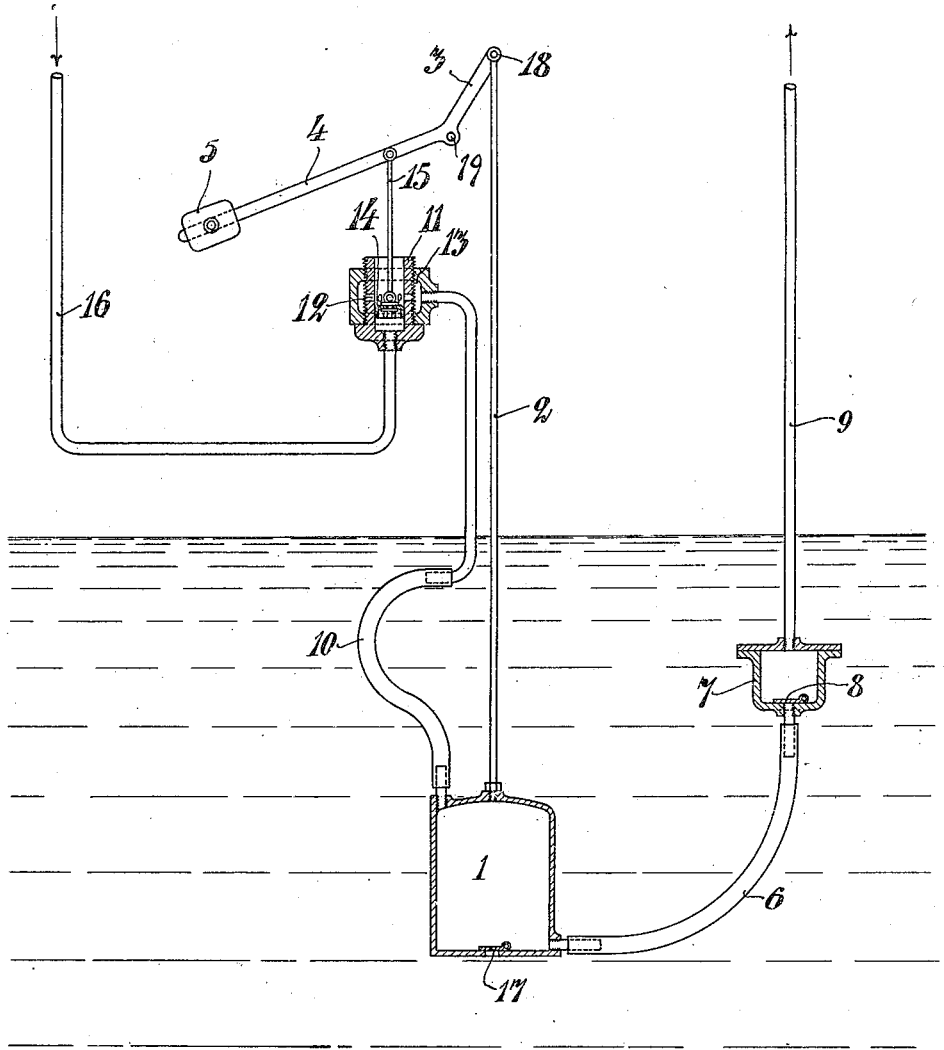

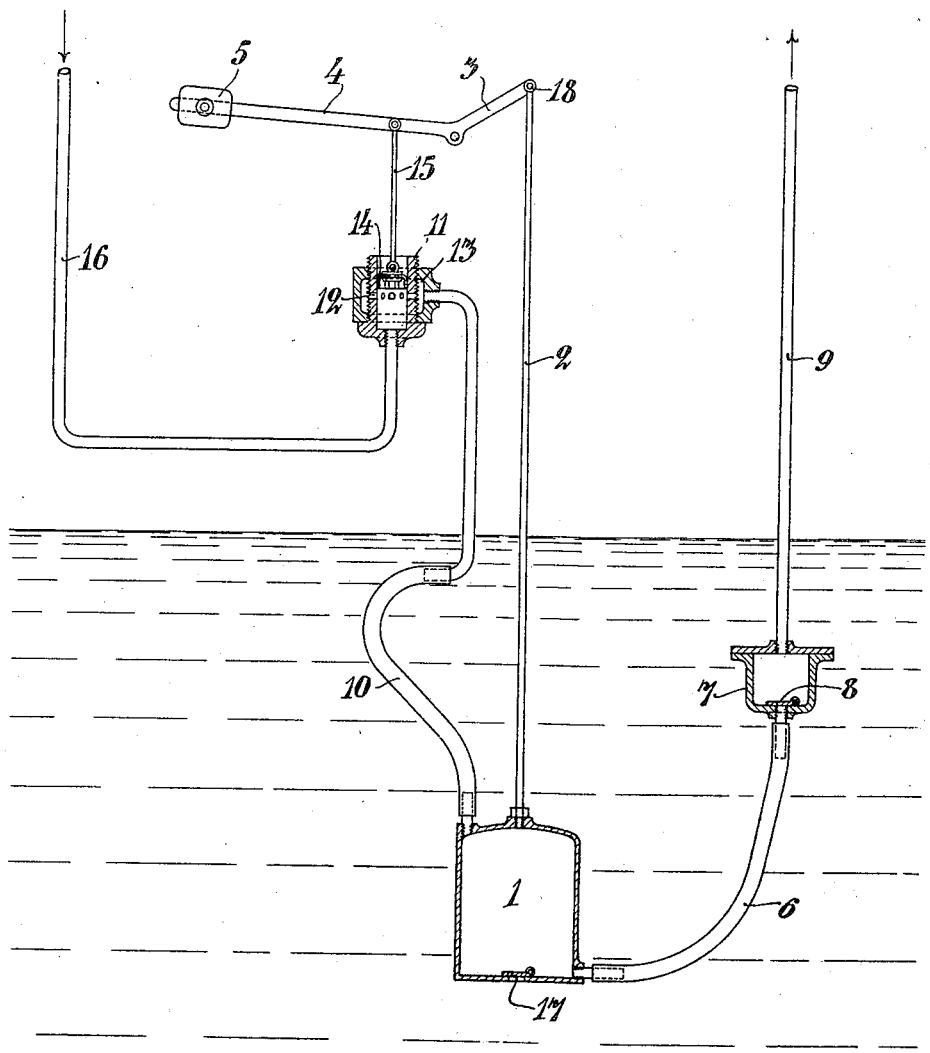

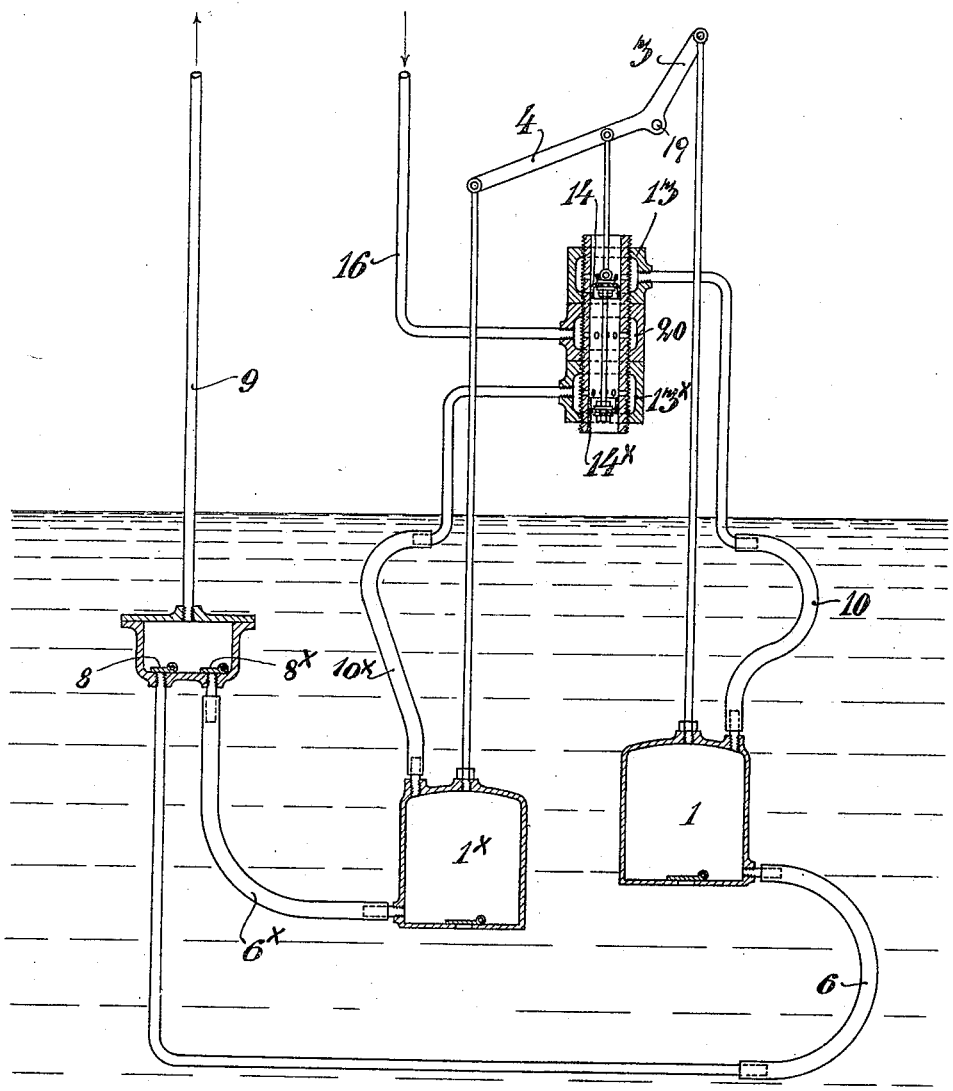

HUGO PER WILHELM ESPING, OF NÄSSJÖ, SWEDEN.

MEANS FOR RAISING LIQUIDS.

No. 922,870.   Specification of Letters Patent.   Patented May 25, 1909.

Application filed April 30, 1908. Serial No. 430,192.

*To all whom it may concern:*

Be it known that I, HUGO PER WILHELM ESPING, a subject of the King of Sweden and resident of Nässjö, in the Kingdom of Sweden, have invented certain new and useful Improvements in Means for Raising Liquids, of which the following is a specification, reference being had therein to the accompanying drawing.

This invention relates to a device for raising liquids by means of compressed air in such manner, that one or more closed vessels, submerged in the liquid, are filled automatically with liquid through a valve provided in the bottom of the same, the liquid being then forced from the vessel or vessels upward through a pipe by the compressed air, led into the said vessel or vessels. The said air is then discharged from the vessel, which is again filled and so on. The vessel or vessels are so constructed, that they can rise and sink in the liquid alternately, due to the fact that they have been emptied and filled respectively, and the movement of the vessel or vessels is used for actuating automatically a valve discharging the air from the vessel or vessels or allowing the air to enter the same. For the guiding of the vessel during its movement it is connected with a two-armed lever, provided either with a counter-weight if only one vessel is used, or with two vessels connected to the arms respectively.

Figure 1 in the accompanying drawing shows the device provided with only one vessel and with a counterweight. Fig. 2 shows the parts in another position. Fig. 3 shows the device provided with two vessels.

The vessel 1 is suspended to the short arm 3 of a two-armed lever by means of a rod 2, the other arm 4 of the said lever being provided with a counter-weight 5. The vessel 1 communicates in a movable manner with a valve casing 7 through a hose 6, the said casing being provided with a check valve 8 and a pipe 9, through which the liquid is raised. The vessel 1 communicates also with a valve casing 11 through a hose 10, the side walls of the said casing being provided with openings 12, leading to an outer chamber 13, and a piston shaped valve 14 mounted in the casing, which by a link 15 is connected with the lever arm 4. A compressed air pipe 16 extends downward from the bottom of the valve casing 11, which is open at its top part, and the hose 10 communicates with the chamber 13. In the bottom of the vessel 1 a valve 17 is provided, which can be opened inward.

The position of the suspension point 18 of the link 2 on the lever arm 3 is so adapted, that it is located above the horizontal line passing through the swinging point 19 of the lever also when the lever is in the center position between its extreme positions shown in Figs. 1 and 2. For that reason the lever is bevel shaped, the arm 3 extending upward in an oblique direction, when the arm 4 occupies its horizontal position. The lever may, however, have another shape as for instance it may consist of a broad beam-like piece, the position of the suspension point being nevertheless the same as stated above. Supposing the vessel is filled with compressed air, it will occupy the upper position shown in Fig. 1, acted upon by the counter-weight 5. The piston 14 is then below the openings 12 and the compressed air can escape from the vessel through the open top end of the valve casing 11, while the pipe 16 is shut off. At the same time the vessel is filled with liquid entering through the valve 17. When the vessel is filled with liquid, it overweighs the counter-weight 5 and sinks to the lower position shown in Fig. 2, swinging the lever 3, 4. Owing to this fact the piston 14 is raised to a position above the openings 12. The pipe 15 is thereby put into communication with the vessel, so that the compressed air expels the water from the vessel upward through the pipe 9, past the valve 8. As the vessel has been emptied, its weight has been reduced to such degree, that it is raised by the counter weight to the upper position shown in Fig. 1, the exit passage for the compressed air in the vessel 1 being then again opened. In this manner the vessel is filled and emptied alternately and automatically and, for each time it is emptied, the liquid is forced upward in the pipe 9. Owing to the position of the suspension point 18 above the horizontal line through the swinging point of the lever, the length of the lever arm of the vessel with regard to the swinging point of the lever 3, 4 is reduced more rapidly than the lever arm of the counter weight, which coincides more closely with the said line i. e. is located substantially at its maximum distance horizontally from the said swinging point. Generally speaking, the suspension point of the vessel is located above the horizontal line passing through the swinging point of the lever, when the said lever is in its middle position. Owing to the said fact the movement of the vessel upward will be rapid, as the equilibrium will not be stable, until the vessel and the lever have come to the extreme position, determined by some obstacle to the movement. As the vessel descends, the lever arm of the same increases more rapidly than that of the counter weight, the movement being also then accelerated.

A vessels may, as already stated, be substituted for the counter weight, suspended from the arm 3, as shown in Fig. 3. The vessels 1 and $1^\times$ are suspended from each of the arms of the lever 3, 4 and communicate with the pipe 9 through hoses 6 and $6^\times$ and corresponding valves 8, $8^\times$. In the valve casing two pistons 14, $14^\times$ are provided and the said casing is open at its top end as well as at its bottom end and inclosed by a top chamber 13 and a bottom chamber $13^\times$ and an intermediate chamber 20. The pipe 10 of the vessel 1 communicates with the top chamber 13, and the pipe $10^\times$ of the vessel $1^\times$ communicates with the bottom chamber $13^\times$, while the pipe 16 communicates with the chamber 20. In the chambers openings are provided, which are opened and closed alternately by the pistons moved upward or downward in such manner, that one of the vessels is filled at the same time as the other vessel is emptied and vice versa, a continual stream of liquid being thereby forced through the pipe 15. The lever is located above the surface of the liquid and arranged and operates in the same manner as illustrated in Figs. 1 and 2 and stated above.

Having now described my invention, what I claim as new and desire to secure by Letters Patent is:

1. A compressed air liquid pump comprising a counterbalanced lever located above the surface of the liquid to be pumped, a closed vessel located beneath the surface of said liquid and provided with a valve, the said vessel being connected with one arm of the lever and free to rise and fall within the liquid, a conduit for conducting compressed air to and from the vessel, a liquid discharge pipe connected with the vessel and a valve located above the surface of the liquid for opening and closing the compressed air conduit to and from the atmosphere, and a connection between the valve and the lever for placing the valve under the control of the lever.

2. A compressed air liquid pump comprising a counter-balanced lever located above the surface of the liquid to be pumped, closed vessels submerged in the liquid and connected with the opposite arms of the lever to counterbalance it, the said vessels being provided with valves for admitting the liquid therein, compressed air conduits leading to the said vessels, discharge conduits leading from the vessels to a common discharge pipe, a valve located above the surface of the liquid to be operated upon, and arranged to close the compressed air conduits to and from the atmosphere, the said valve being connected with the counterbalanced lever and under the control of the lever to be operated.

3. In a compressed air liquid pump, a submerged vessel free to rise and fall within the liquid, a counterbalanced lever located above the surface of the liquid and having an arm connected with the submerged vessel and extending upwardly at an angle oblique to the surface of the liquid whereby the leverage of said arm is rapidly shortened during the upward movement of the vessel, means for admitting compressed air to and discharging it from the vessel and means for discharging the liquid from the vessel.

In witness whereof, I have hereunto signed my name in the presence of two subscribing witnesses.

HUGO PER WILHELM ESPING.

Witnesses:
M. KLAMING,
E. HEDENSKAY.